(12) United States Patent
Herberg

(10) Patent No.: US 7,011,200 B2
(45) Date of Patent: Mar. 14, 2006

(54) MULTI-DISC CLUTCH

(75) Inventor: Klaus Herberg, Brackenheim (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 20 days.

(21) Appl. No.: 10/713,108

(22) Filed: Nov. 17, 2003

(65) Prior Publication Data
US 2004/0144612 A1    Jul. 29, 2004

(30) Foreign Application Priority Data
Nov. 15, 2002   (DE)   ................................ 102 53 233

(51) Int. Cl.
F16D 13/52         (2006.01)
(52) U.S. Cl. ................................. 192/107 M
(58) Field of Classification Search ............... 192/70.2, 192/107 R, 107 M, 30 V
See application file for complete search history.

(56) References Cited

U.S. PATENT DOCUMENTS

| 4,828,089 | A | 5/1989 | Collins et al. | |
| 4,846,326 | A | 7/1989 | Tilton et al. | 192/70.19 |
| 5,452,728 | A | 9/1995 | Iams | 128/845 |
| 5,452,784 | A | 9/1995 | Miyoshi et al. | 192/107 |
| 5,937,989 | A * | 8/1999 | Yoneda | 192/214.1 |
| RE36,363 | E | 11/1999 | Tilton et al. | 192/70.19 |
| 6,042,935 | A | 3/2000 | Krenkel et al. | |
| 6,451,872 | B1 * | 9/2002 | Yamane | 523/156 |
| 6,524,681 | B1 * | 2/2003 | Seitz et al. | 428/143 |

FOREIGN PATENT DOCUMENTS

| DE | 44 11 641 | 10/1995 |
| DE | 44 38 456 | 5/1996 |
| DE | 195 14 808 | 2/1998 |
| DE | 197 01 292 | 9/1998 |
| DE | 199 39 545 | 2/2001 |
| DE | 101 27 891 | 3/2002 |
| DE | 102 49 397 | 4/2003 |
| DE | 101 56 947 | 6/2003 |
| EP | 0 807 215 | 11/1997 |
| EP | 1 293 694 | 3/2003 |
| EP | 1 323 944 | 7/2003 |

* cited by examiner

Primary Examiner—Saul Rodriguez
(74) Attorney, Agent, or Firm—Crowell & Moring LLP

(57) ABSTRACT

A friction clutch is provided between an internal combustion engine and a transmission, which is incorporated in a motor vehicle, the clutch comprising driving disks and transmission disks. In order to optimize the clutch particularly with respect to comfort and wear resistance, the driving disks and the transmission disks, at least in the region of the friction sections, are constructed in such a manner that the friction sections are largely shudder insensitive.

3 Claims, 5 Drawing Sheets

PRIOR ART

MULTI-DISC CLUTCH

BACKGROUND AND SUMMARY OF THE INVENTION

The invention relates to a clutch, preferably a multi-disc clutch between an internal combustion engine and a transmission, which are incorporated in a motor vehicle, the clutch comprising driving disks and transmission disks.

A clutch of the type above is known from U.S. Pat. No. 4,846,326 and U.S. Pat. No. Re. 36,363 and is provided with driving disks and transmission disks of carbon. Investigations have shown that, when the driving disks as well as the transmission disks of the clutch consist of carbon, comfort disadvantages, which appear as interfering shudder during starting processes, occur when such clutches are used in serially produced motor vehicles.

U.S. Pat. No. 5,452,728 discloses clutch disks, between which separating disks of steel are provided. The separating disks are provided with a layer of ceramic.

U.S. Pat. No. 5,452,784 deals with a multi-disc clutch, the driving disks and transmission disks of which have a thin film of ceramic on the mutually facing surfaces.

An aspect of the invention is to construct driving disks and transmission disks of a clutch, disposed between the internal combustion engine and the transmission of a motor vehicle, in such a manner by a selective configuration, that the clutch, at a high torque transfer and wear resistance, is distinguished by an optimized operational capability with respect to the function.

Pursuant to certain preferred embodiments of the invention, this aspect may be accomplished in that the driving disks (2, 3, 4 and 5) and the transmission disks (6 and 7), at least in a region of friction sections (RaI, RaII, RaIII, RaIV, RaV, RaVI, RaVII and RaVIII) are formed in such a manner, that the friction sections are largely shudder insensitive.

Advantages, achieved with certain preferred embodiments of the invention, are to be seen therein that, due to a selective development of the driving disks and of the transmission disks or their friction sections of the clutch, the latter not only securely transmits torque and is wear resistant, but is also largely insensitive to shudder and, with that, renders a contribution to improving comfort. Moreover, due to a defined selection of materials for the driving disks and the transmission disks or their friction sections, a decreasing coefficient of friction is developed during their interaction. The materials of the driving disks and of the transmission disks, optionally only the friction surfaces of the latter, have, on the one hand, a high wear resistance and speed stability and, on the other, a high coefficient of friction and a high thermal stability. Moreover, the clutch is optimized thereby if, for example, the driving disks are made of a ceramic with a fiber fabric and the transmission disks are made of a sintered, organically bounded material. The latter material, especially, has compressible properties, which support comfortable interaction between the driving disks and the transmission disks.

Other objects, advantages and novel features of the present invention will become apparent from the following detailed description of the invention when considered in conjunction with the accompanying drawings.

DETAILED DESCRIPTION OF THE DRAWINGS

Figure 1:
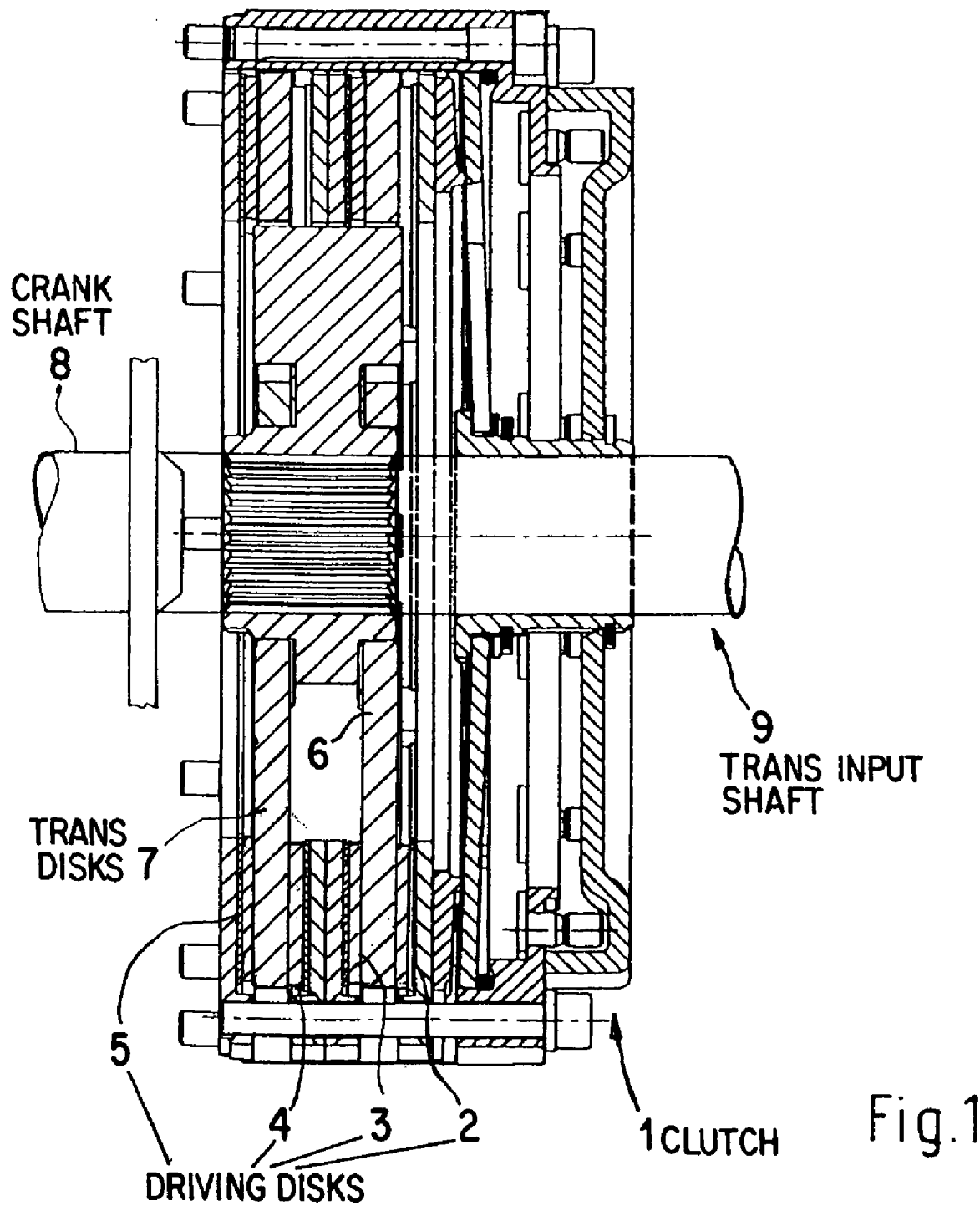
FIG. 1 shows a longitudinal section through a clutch, which is disposed between an internal combustion engine and a manual transmission.
Figure 2:
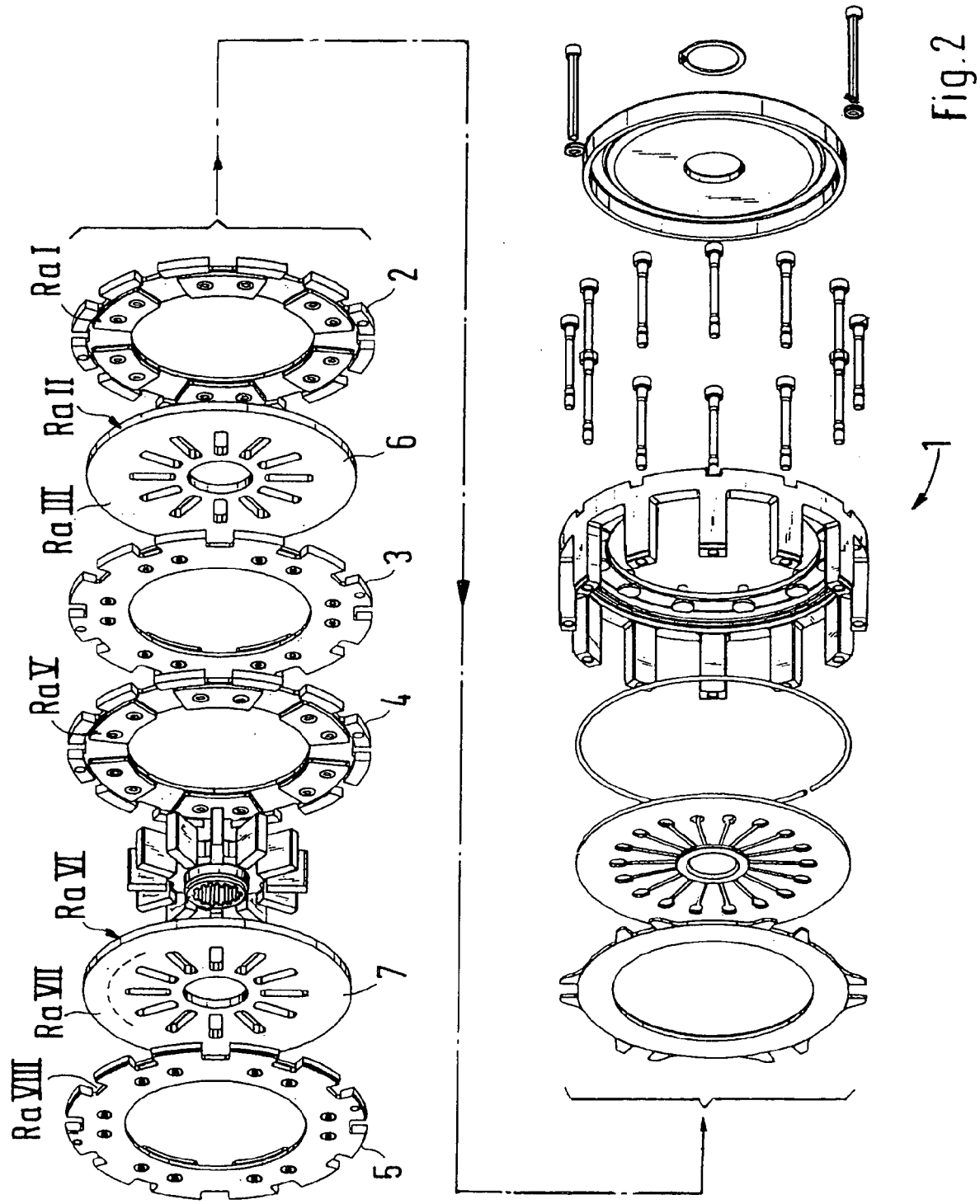
FIG. 2 shows details of FIG. 1 in and exploded diagram.

A clutch 1 of the frictional type may be disposed between an internal combustion engine and a manual transmission of a motor vehicle of the sports car type, belonging, for example, to the high-performance category. Only the clutch 1 is shown. It is constructed as a multi-disc clutch and comprises the driving disks 2, 3, 4 and 5 as well as the transmission disks 6 and 7. The driving disks 2, 3, 4 and 5 are connected with a crankshaft 8 of the internal combustion engine; the transmission disks 6 and 7 are connected with a transmission input shaft 9.

Between the driving disks 2, 3, 4 and 5 as well as the transmission disks 6 and 7, friction sections RaI, RaII, RaIII, RaIV, RaV, RaVI, RaVII and RaVIII are provided. The driving disks 2, 3, 4 and 5 as well as the transmission disks 6 and 7 themselves or their friction sections RaI, RaII, RaIII, RaIV, RaV, RaVI, RaVII and RaVIII are constructed so that the latter are largely indifferent to shudder. For this purpose, materials are used, by ways of which a decreasing coefficient of friction Rw is formed. This is supported if the driving disks 2, 3, 4 and 5 as well as the transmission disks 6 and 7 or their associated friction sections RaI, RaII, RaIII, RaIV, RaV, RaVI, RaVII and RaVIII have, on the one hand, a high wear resistance as well as speed stability and, on the other, a high coefficient of friction and a high thermal stability.

In the example, the transmission disks 6 and 7 or the corresponding friction sections are made of a ceramic, that is, of carbon fiber-reinforced, porous carbon, the pores of which are filled at least partially with silicon and silicon carbide. This carbon is infiltrated with liquid silicon using a liquid siliconizing process and subjected to a heat treatment, during which the silicon reacts with the carbon to form SiC (see DE 44 38 456 A1). Fiber fabrics, which have a multidirectional structure and extend in the plane of the disc, are incorporated in the transmission disks 6 and 7, so constructed, for reasons of strength (bursting speed). Moreover, this ceramic is provided with reinforcing fibers, which have an average length of at least 50 mm.

On the other hand, the driving disks 2, 3, 4 and 5 or their friction sections are made of a sintered, organically bound material, which comprises the following metallic and non-metallic components: brass, iron, copper, aluminum, a silicon-rich phase, a sulfur-rich phase, carbon and a phenolic resin binder. Systematic selection investigations have revealed that the driving disks 2, 3, 4 and 5 or their friction sections have teleological properties if said components are distributed as follows: brass, approximately 14 to 16% by volume, iron approximately 18 to 20% by volume, copper approximately 3 to 6% by volume, aluminum approximately 5 to 6% by volume, silicon-rich phase approximately 1 to 3% by volume, sulfur-rich phase 3 to 4 percent by volume, carbon approximately 28 to 30% by volume and phenolic resin binder the remaining % by volume.

The driving disks 2, 3, 4 and 5 and the transmission disks 6 and 7 can be fabricated in one piece with the inventive materials. It is, however, also conceivable that said materials are provided only in the friction sections RaI, RaII, RaIII, RaIV, RaV, RaVI, RaVII and RaVIII; there may also be only several layers which are distributed over the periphery and connected by riveting, gluing or the like with the appropriate driving disks.

Figure 3:
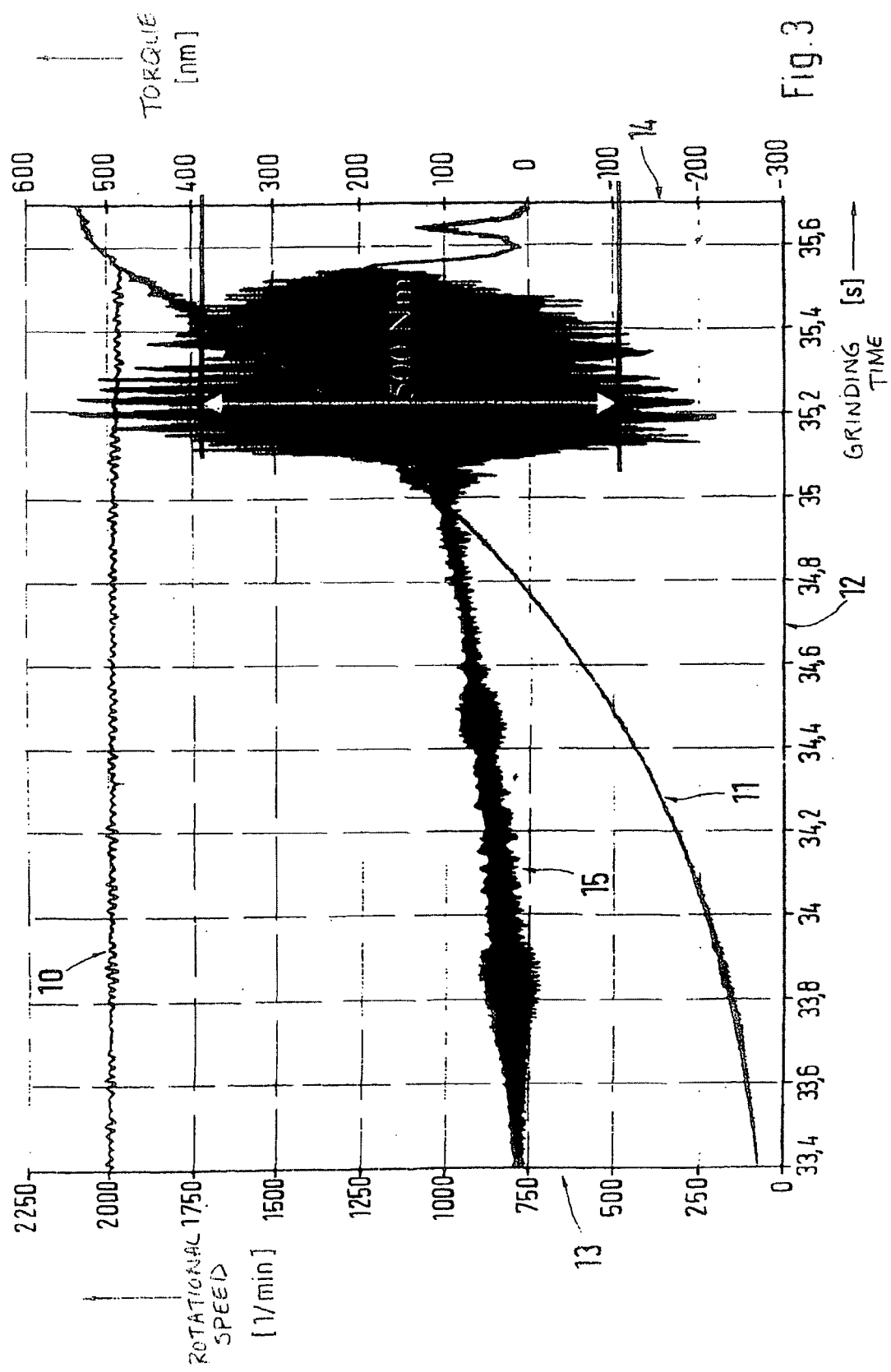
FIG. 3 shows a diagram of the course of a torque between the driving speed and the output speed of a conventional clutch.

FIG. 3 shows a diagram demonstrating the course of the torque transfer of clutching processes between the driving speed 10 and the driven speed 11 of a clutch without the driving disks and transmission disks of the present invention. The grinding time in seconds is plotted on the abscissa 12, the rotational speed (1/min) on a first, left ordinate 13 and the torque (Nm) on a second, right ordinate 14. It becomes clear that, at a specified driving speed 10 or driven speed 11, a torque line 15 has appreciable deflections between about 35 and about 35.5 seconds, which are perceived by the driver as interfering shudder.

Figure 4:
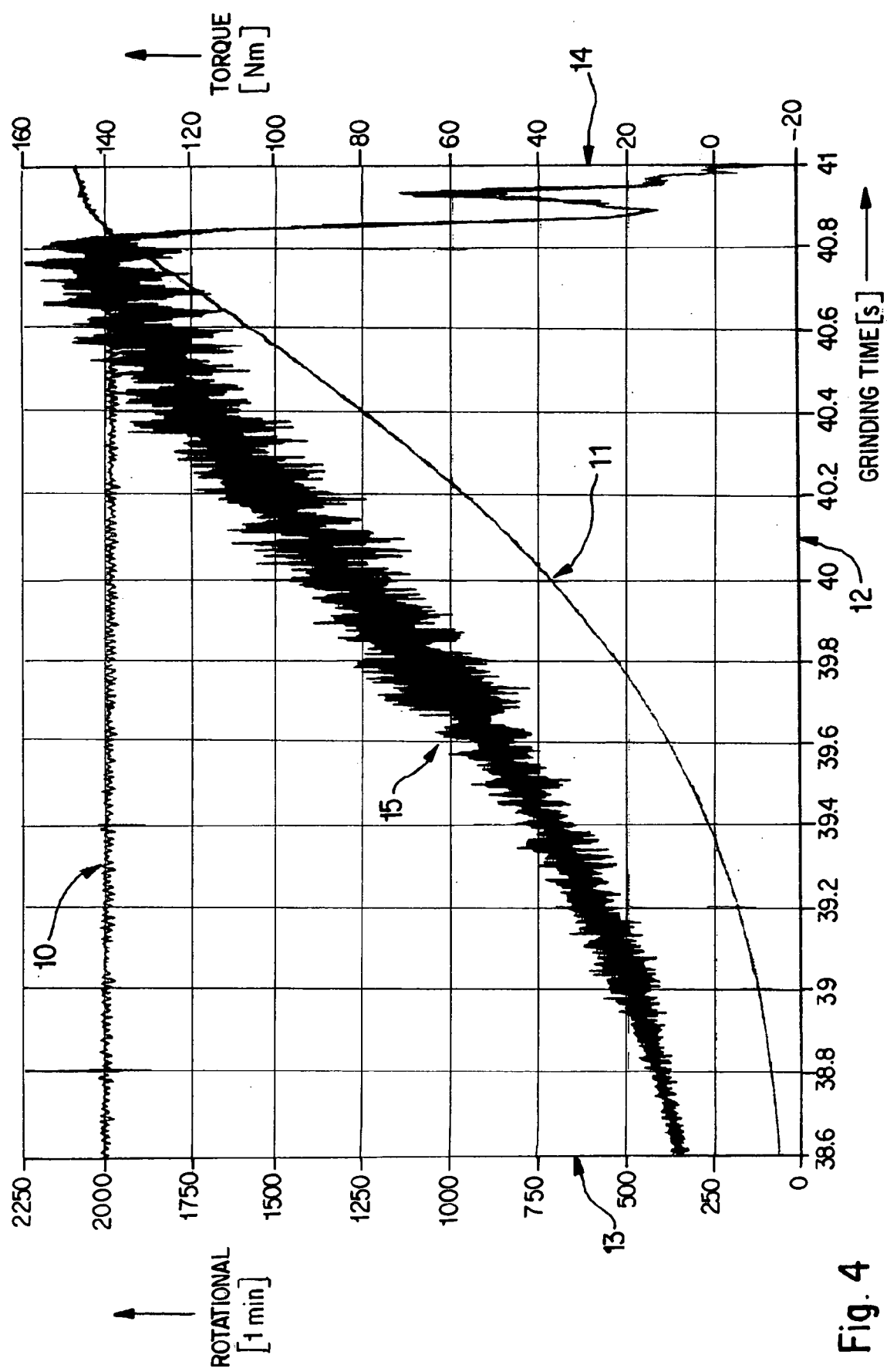
FIG. 4 shows a diagram, corresponding to FIG. 2, however of a clutch with the distinguishing features of the invention

The diagram of FIG. 4 indicates a torque transfer with the same driving speed 10 and driven speed 11, shown in FIG. 3. However, the driving disks 2, 3, 4 and 5 as well as the transmission disks 6 and 7 have an inventive structure. In the grinding time between 38.6 and 40.8 seconds, the torque line 15 of the clutch, so configured, shows, with justifiable deflections, the same trend as the driven speed 11, indicating the largely shudder-free behavior of the driving disks 2, 3, 4 and 5 as well as of the transmission disks.

Figure 5:
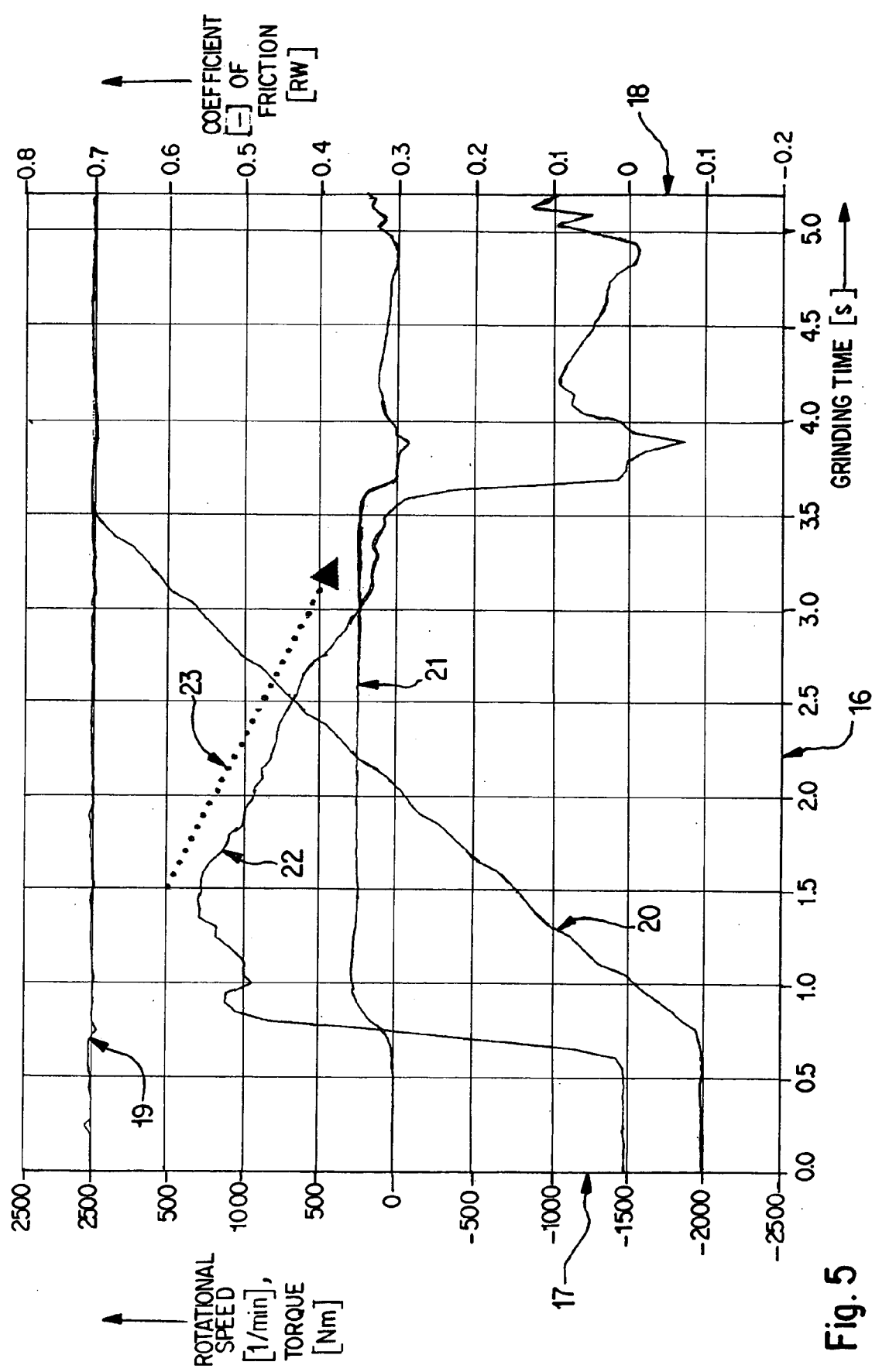
FIG. 5 shows a diagram of the course of the coefficient of friction of the clutch with the distinguishing features of the invention.

Finally, FIG. 5 shows a diagram, in which the grinding time in seconds is plotted on the abscissa 16. The first left ordinate 17 shows the rotational speed (1/min) and the torque (Nm) and a second right ordinate 18 shows the coefficient of friction (Rw). In addition, the diagram contains the following lines: the driving speed 19, the driven speed 20, the torque 21 and the coefficient of friction 22.

Due to the inventive driving disks 2, 3, 4 and 5 and the inventive transmission disks 6 and 7, it follows that, in the grinding time between 1.5 and 3.6 seconds, the coefficient of friction 22 shows a decreasing tendency, which is emphasized by the arrow line 23. This is equivalent to the shudder insensitivity of the inventive clutch 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A friction clutch for use between an internal combustion engine and a transmission in a motor vehicle, comprises
   a driving disk having a friction section; and
   a transmission disk having a friction section,
   wherein the friction sections comprise materials having a coefficient of friction that decreases as the relative speed between the friction sections decreases,
   wherein the friction section of the transmission disk includes a ceramic material with a fiber fabric, and
   wherein the friction section of the driving disk includes a sintered organically bound material.

2. The clutch according to claim 1, wherein the fiber fabric has a multi-directional structure.

3. The clutch according to claim 1, wherein the ceramic material includes reinforcing fibers which have an average length of at least 50 mm.

* * * * *